United States Patent Office 2,957,160
Patented Oct. 18, 1960

2,957,160

INDICATOR DEVICES TO CONTROL THE RUNNING CONDITION OF MOTOR VEHICLES

Gyorgy Taganyi and Ferenc Vidai, Budapest, Hungary, assignors to Kozlekedesi Meromuszerek Gyara, Budapest, Hungary Filed Jan. 14, 1959, Ser. No. 786,857

Claims priority, application Hungary Jan. 15, 1958

5 Claims. (Cl. 340—52)

Devices for optically indicating service data of land, air, and sea motor vehicles are known, wherein several values of an operative datum are indicated by signal lamps equal in number to the number of said different values, the signal lamps giving lights of different colors.

The present invention has for its object to reduce materially the quantity of the lamps and of their accessories while maintaining the number of values to be indicated, so that a simpler and cheaper device is obtained. To this effect, a special control switch is used which makes it possible to light each lamp individually, as hitherto, and groups of lamps additionally, whereby the number of the value bands to be indicated is increased by $n-1$, where $n$ designates the number of the lamps.

According to the present invention, there is provided a device optically indicating service data of motor vehicles in which a movable contact element of an electric control switch is operated by a member sensing the operative datum. Said movable contact element and several fixed contact elements of said control switch cooperating therewith, as well as signal lamps of different colors connected to said fixed contact elements directly or through ohmic resistances, are inserted between said sensing member and a source of electric current. The number of said fixed contact elements is one less than double the number of said signal lamps.

Further particulars and advantages of the indicator device unit will result from the following description of an example of the same, illustrated in the accompanying drawing, in which.

In a motor truck e.g. the following operational data have to be measured:

I. Oil pressure in the engine,
II. Temperature of the cooling water,
III. Pressure of braking air,
IV. Pressure of air in the brake tank
V. Amount of fuel.

In the motor vehicle taken as example the following values or ranges of values have to be measured:

I. Oil pressure is usually measured in the range between 0 and 5 kg./cm.$^2$. Pressures are dangerous below 2 kg./cm.$^2$ and normal in the range of 2 to 4 kg./cm.$^2$. Pressures of 4 to 5 kg./cm.$^2$ are above normal, but still permit safe operation.

II. Temperature of cooling water is insufficient below 40° C., normal in the range from 60 to 90°, and dangerous in the vicinity of the measuring ceiling, 90 to 100° C.

III and IV. Air pressure measurements lie in the range from 0 to 10 kg./cm.$^2$. Pressures are dangerous below 2 kg./cm.$^2$, normal in the range from 4 to 6 kg./cm.$^2$ and, while the range from 8 to 10 kg./cm.$^2$ is too high, it is still permissible in operation.

V. The amount of fuel, when measured in a 120 liter tank, lies in the following range: 1 to 10 liters means reserve supply, 10 to 30 liters are in the range between reserve supply and ¼ of the tank capacity, 30 to 60 liters between ¼ and ½ capacity, 60 to 90 liters between ½ and ¾ capacity, 90 to 120 liters between ¾ and full capacity.

Figure 1:
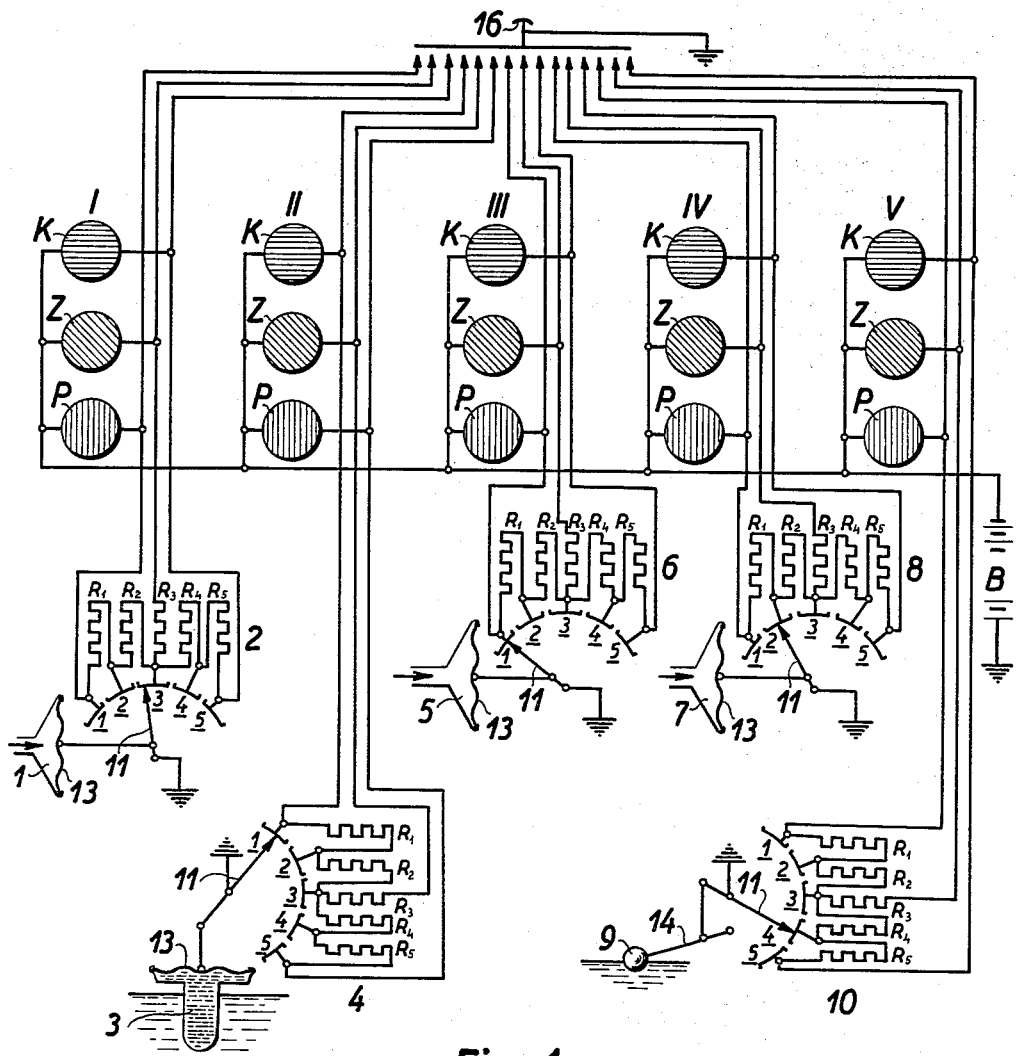
Fig. 1 is a circuit diagram.

The above described ranges or their limit values are made visible by means of the device according to the circuit diagram in Fig. 1.

Each different measuring value range is indicated by a series of three lamps each, arranged in parallel rows below each other so as to form horizontal rows. The first series indicates oil pressure, the second the temperature of the cooling water, the third the pressure of the braking air, the fourth the pressure in the compressed air tank, and the fifth series indicates fuel amount. The three lamps in each series radiate green, blue and red light, respectively. The letters represent the following colours: K stands for blue, Z for green and P for red light. They are also signalled in the figure by hatching, i.e. horizontal, oblique and vertical hatching, respectively.

The measuring transmitter device for the first lamp series is a pressure gauge whose membrane 13 actuates the movable contact 11 which in the position represented in the drawing engages the third contact of the fixed contact row, and is grounded. Said third contact member corresponds to the measuring range from 2.3 to 3.8 kg./cm.$^2$. In the represented position of the contact member 11 the oil pressure has not approached either the higher or lower extremes of the indicated range. Current is fed to the green lamp Z over the resistance $R_3$ so that the intensity of its light is lessened. Although current flows also to the lamps P and K over the resistances $R_1$, $R_2$ and $R_3$, $R_4$, respectively, the resultant resistance is so high that the current flowing through said lamps is not sufficient to heat their fiilaments to incandescence.

Thus, the operator is informed by the green light of the lamp Z that oil pressure is normal, whereas the red light of the lamp P or the blue light of the lamps K would indicate an oil pressure below or above the normal.

The measuring transmitter 3 for the series of lamps II is a liquid thermometer whose membrane 13 also actuates a movable contact 11, as represented. In the represented position the said and similarly earthed contact member engages the first section of the fixed contact group, since the temperature of water is below normal. The lamp K, being directly connected with said contact section, burns at full intensity, whereas the lamps Z and P are not illuminated as the current flowing to them over the resistances $R_1$, $R_2$ and $R_3$ or $R_1$, $R_2$, $R_4$ and $R_5$ respectively, is insufficient for illuminating the latter lamps. On the other hand, should the temperature of the cooling water reach or exceed the normal value, the lamp Z or P respectively would be illuminated. When the temperature reaches the limit of excessively high temperature, lamp Z burns at one quarter and lamp P at one half intensity.

The measuring transmitter for the lamp series III is an air pressure gauge 5 in which membrane 13 engages an earthed contact 11. In the position represented in the drawing said contact engages the first section of the fixed contact, since the air pressure is dangerously low. The lamp P is therefore illuminated at full intensity, while the rest of the lamps of this series are not illuminated, owing to the reasons set forth above. Limit values are indicated by reduced light intensity, in accordance with the procedure described above.

The measuring transmitter associated with the lamp series IV is an air pressure gauge 7 connected to the brake tank. Here again the membrane 13 engages a grounded contact 11. In the position shown in the drawing said contact engages the second contact in the fixed contact group, the air pressure in the brake tank being in the range from 2 to 4 kg./cm.$^2$, that is, below the lower limit of normal pressure. Hence, the green lamp Z burns, but its intensity is reduced by the resistances $R_2$ and $R_3$ to, say, one quarter, whereas the red lamp P being connected with the resistance $R_1$ burns at about half intensity.

The measuring transmitter of the lamp group V comprises a float 9, actuating a rod 14, and the movable earth contact 11 engages in this case the fifth section of the voltage distributor 10. This position corresponds to a fuel amount of 60 to 90 liters, say, for example, 80 liters. In this case current is supplied to the lamp K over the resistance $R_5$ and the lamp accordingly burns at half intensity, whereas the lamp Z is illuminated with one quarter intensity only, owing to the resistances $R_4$ and $R_5$. The lamp K is not illuminated at all, in consequence of the resistances $R_1$, $R_2$, $R_3$ and $R_4$ being inserted.

The light intensity of the individual lamps of each series may be similar to or different from one another. In the latter case the light intensity of the lamps Z in each series, indicating the normal values, should preferably be the lowest, so as not to disturb the operator. Accordingly, intensity should be the maximum for the lamps P, indicating danger or breakdown, in order to surely attract the attention of the operator.

According to another feature of the invention the luminous intensity of the whole unit may be adjusted to conform with the ambient light. To this end it is possible to insert an adjustable resistance into the circuit serving to ground the battery B or connected to the series of lamps, said resistance permitting either step-by-step or smooth regulation. Such overall regulation of luminous intensity may however be attained also by mechanical means, such as the use of light filters or the like.

With the aid of a checking switch operable by means of button 16, the poles of the signal lamps joined to the control switch can be simultaneously connected to ground with the view of checking whether, in the case of a lamp being unintentionally not lighted, the source of defect is in the circuit of that lamp or inside said lamp. The fault finding procedure is thus essentially facilitated.

Figure 2:
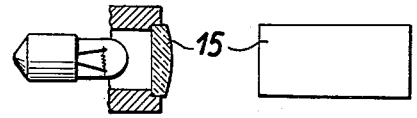
Fig. 2 shows the light signal device and the arrangement of a viewing window.

As shown in Fig. 2 left, the lamps are covered by transparent bodies 15, made for example of a plastic, and having the shape of a lens, or a fluted surface. Their purpose is to make the filament of high intensity invisible, and to disperse the light. In their preferable form these bodies are cylindrical and their face opposite the lamps is fluted. It is furthermore advantageous to arrange on these bodies the inscriptions indicating the value or value range to be signalled by the lamp in question. Such lettering may be made by painting, milling or etching, or by means of stencilling, and brings home to the operator numerical values as soon as any one of the lamps is illuminated.

According to a further embodiment of the invention it is possible to use the series of lamps in combination with pointer instruments. In this event the lamps only indicate the value range, thereby cautioning the operator to read the pointer instrument associated to the lamp group in question.

Figure 3:
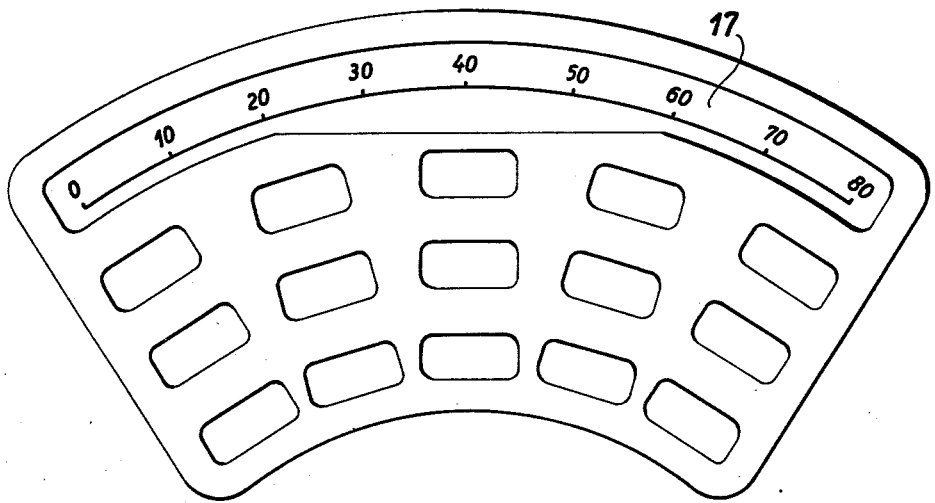
Fig. 3 is an elevation of the whole indicator unit.

Fig. 3 represents an indicator unit in which the indicating lamps are combined with the speedometer to form an arcuate body arranged, e.g. on the instrument panel over the steering column of the vehicle. The scale 17 of the speedometer, realized as a pointer instrument, is on top, and the series of lamps range below it in radial arrangement. The indicator unit is preferably carried out so that at least the cover plate is removable in order to make defective lamps accessible for replacement. Connection of the lamps is preferably effected by a single multipole connector, e.g. a cable joint. Other pointer instruments that may be necessary can be arranged on both sides of the indicator unit on the instrument panel.

The above illustrative example shows that the arrangement according to the invention may be carried out in various forms of realization. So for example the resistances $R_1$ to $R_5$ of the voltage distributors 2, 4, 6, 8 and 10 may have values similar to or different from each other. In all cases, however, the first and last sections of the fixed contacts shall be directly connected to a lamp each, and the resistances $R_1$ to $R_5$ shall be serially connected with each other. The number of sectors as well as the number of lamps in each series may be more or less than three without departing hereby from the scope of the invention as characterized in the following claims.

What we claim is:

1. A device for optically indicating operative data of motor vehicles comprising a switch having a movable contact element actuated by a member sensing the operative datum, a plurality of fixed contact elements engageable by said movable element, a plurality of electric signal lamps of different colors, means connecting one terminal of certain of said lamps directly with certain of said fixed contact elements and through resistances with other of the fixed contact elements, means connecting one terminal of other of said lamps through resistance means to said fixed contact elements, and means connecting said movable contact element and the other terminal of said lamps to a source of electric energy, the number of said fixed contact elements being one less than double the number of said signal lamps.

2. A device according to claim 1, wherein the two signal lamps which indicate the two limits of the operative datum are connected directly, and the signal lamps indicating the intermediate values are connected through ohmic resistances to the respective fixed contact elements.

3. A device according to claim 1, further comprising means for simultaneously connecting the first-mentioned terminals of the lamps directly to the source of electric energy to test the lamps.

4. A device according to claim 1, wherein several series of said signal lamps indicating different operative data are united in a common block.

5. A device for optically indicating operative data of motor vehicles comprising a switch having a movable contact element actuated by a member sensing the operative datum, a plurality of fixed contact elements engageable by said movable element, a plurality of electric signal lamps of different colors, a resistance element connected between each adjacent pair of fixed contact elements, means connecting one terminal of certain of said lamps directly with certain of said fixed contact elements, means connecting one terminal of other of said lamps through resistance means to said fixed contact elements, and means connecting said movable contact element and the other terminal of said lamps to a source of electric energy, the number of said fixed contact elements being one less than double the number of said signal lamps.

References Cited in the file of this patent

UNITED STATES PATENTS

| | | |
|---|---|---|
| 1,542,096 | Riblet | June 16, 1925 |
| 1,588,877 | Donahue | June 15, 1926 |
| 1,602,502 | Pirtle | Oct. 12, 1926 |
| 1,678,115 | Hannon | July 24, 1928 |
| 2,728,072 | Magid | Dec. 20, 1955 |

OTHER REFERENCES

Publication, "Electrical World," vol. 81, No. 13, page 754, Mar. 31, 1923.